Feb. 19, 1924.　　　　　　　　　　　　　　　　1,484,052
H. J. BAUR
FARE REGISTER AND DETACHABLE FARE BOX
Filed Oct. 10, 1919　　　8 Sheets-Sheet 1
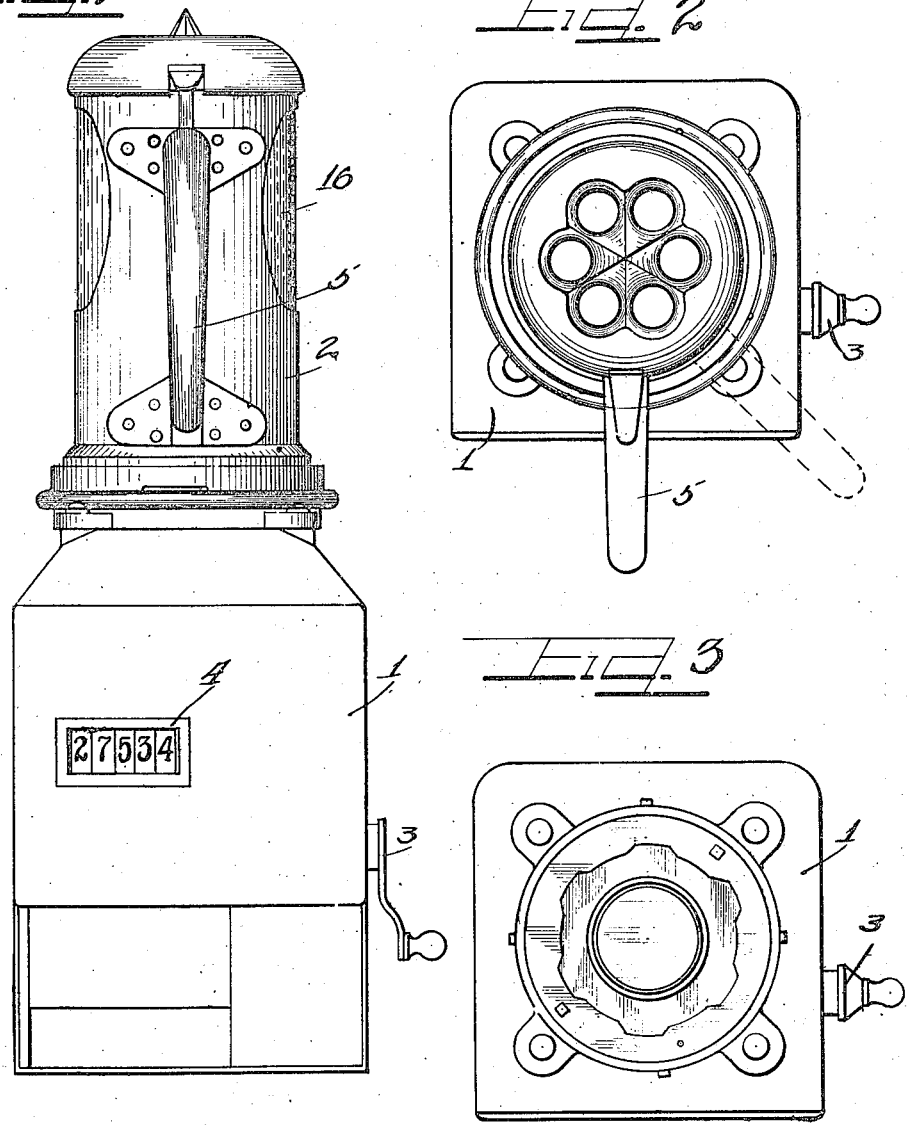

Feb. 19, 1924.
H. J. BAUR
1,484,052
FARE REGISTER AND DETACHABLE FARE BOX
Filed Oct. 10, 1919       8 Sheets-Sheet 2
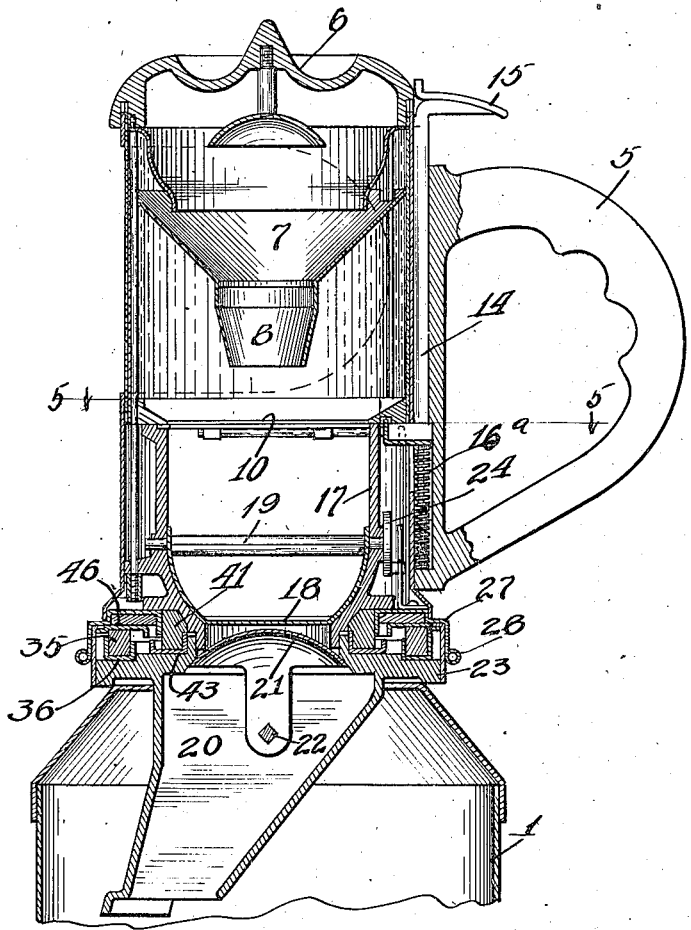

Feb. 19, 1924.  
H. J. BAUR  
FARE REGISTER AND DETACHABLE FARE BOX  
Filed Oct. 10, 1919  
1,484,052  
8 Sheets-Sheet 3
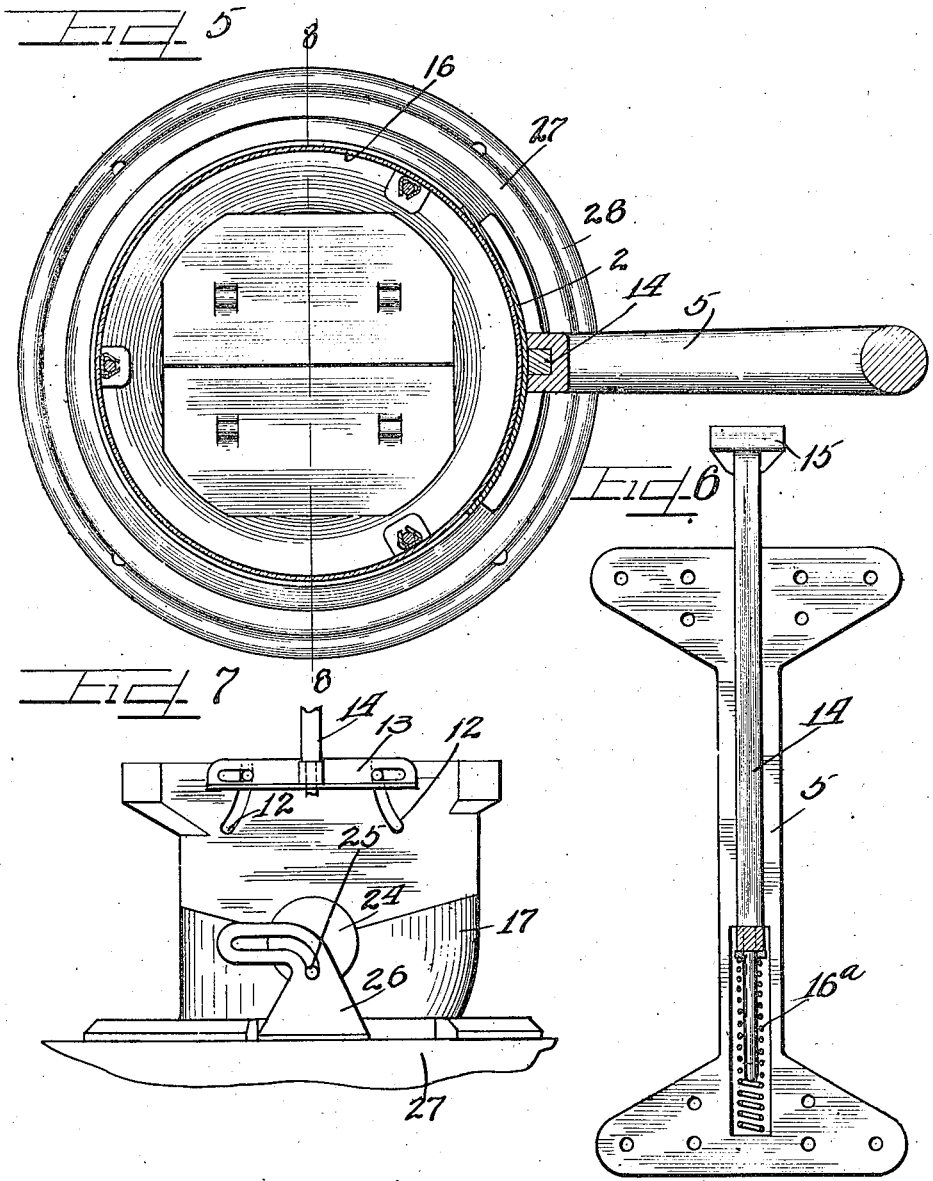

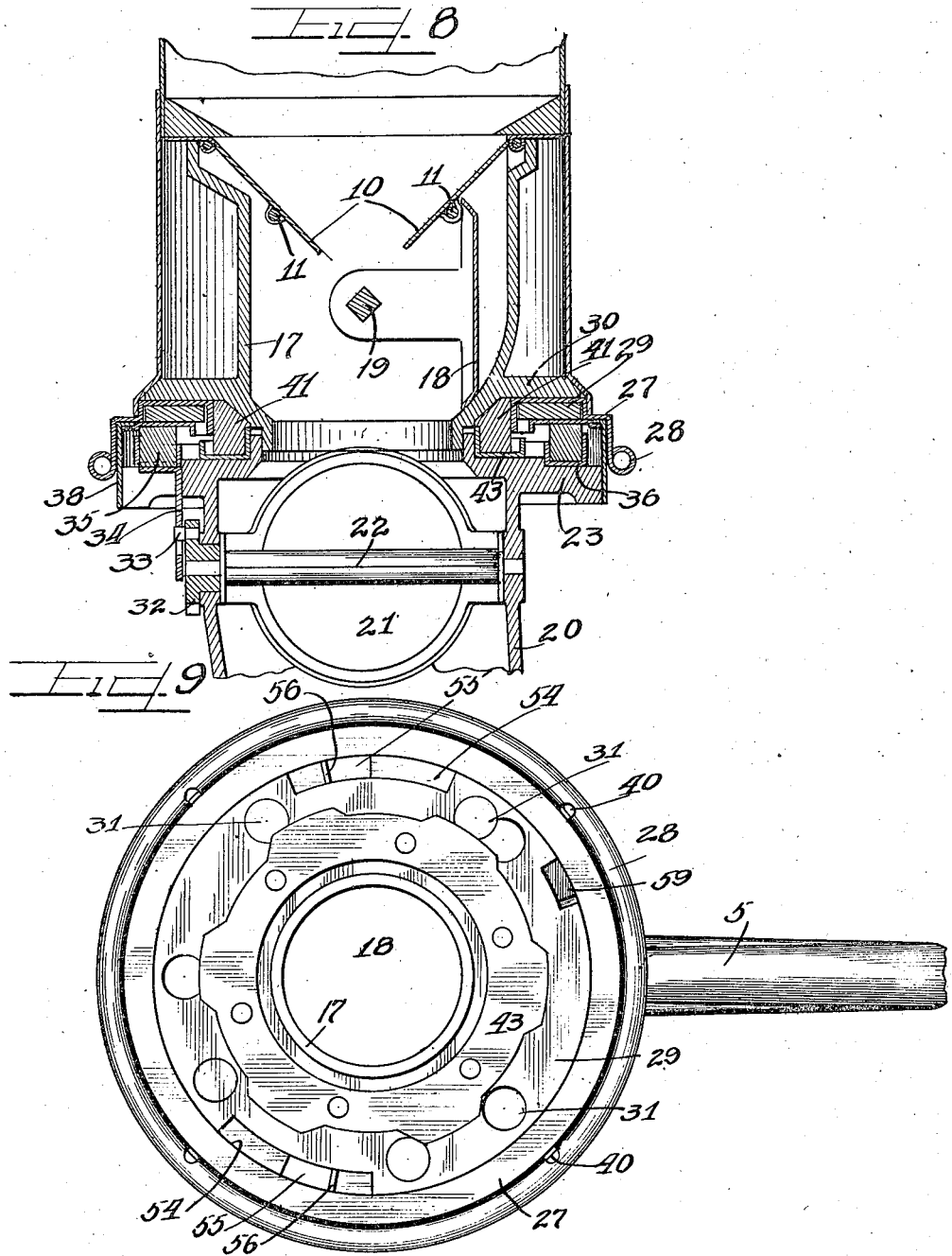

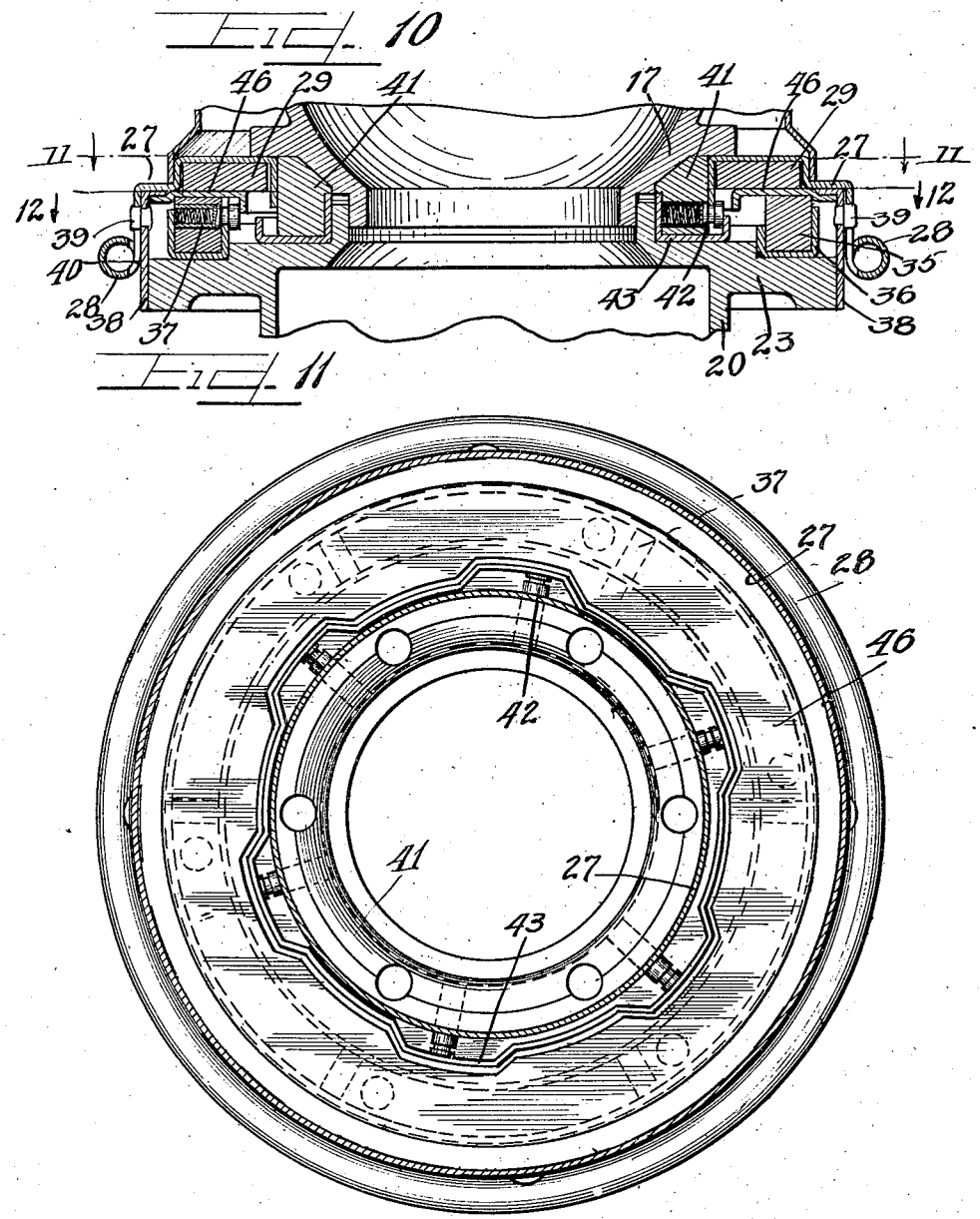

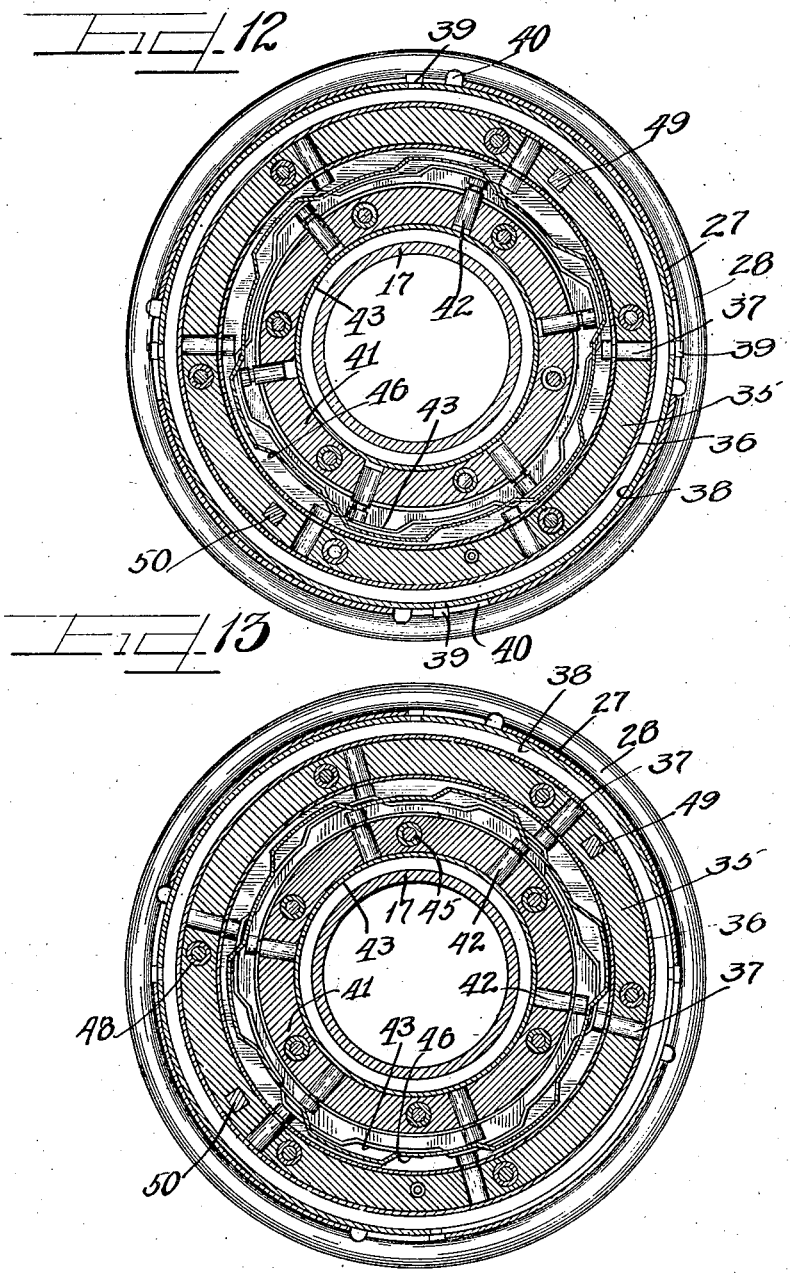

Feb. 19, 1924.
H. J. BAUR
1,484,052
FARE REGISTER AND DETACHABLE FARE BOX
Filed Oct. 10, 1919    8 Sheets-Sheet 7
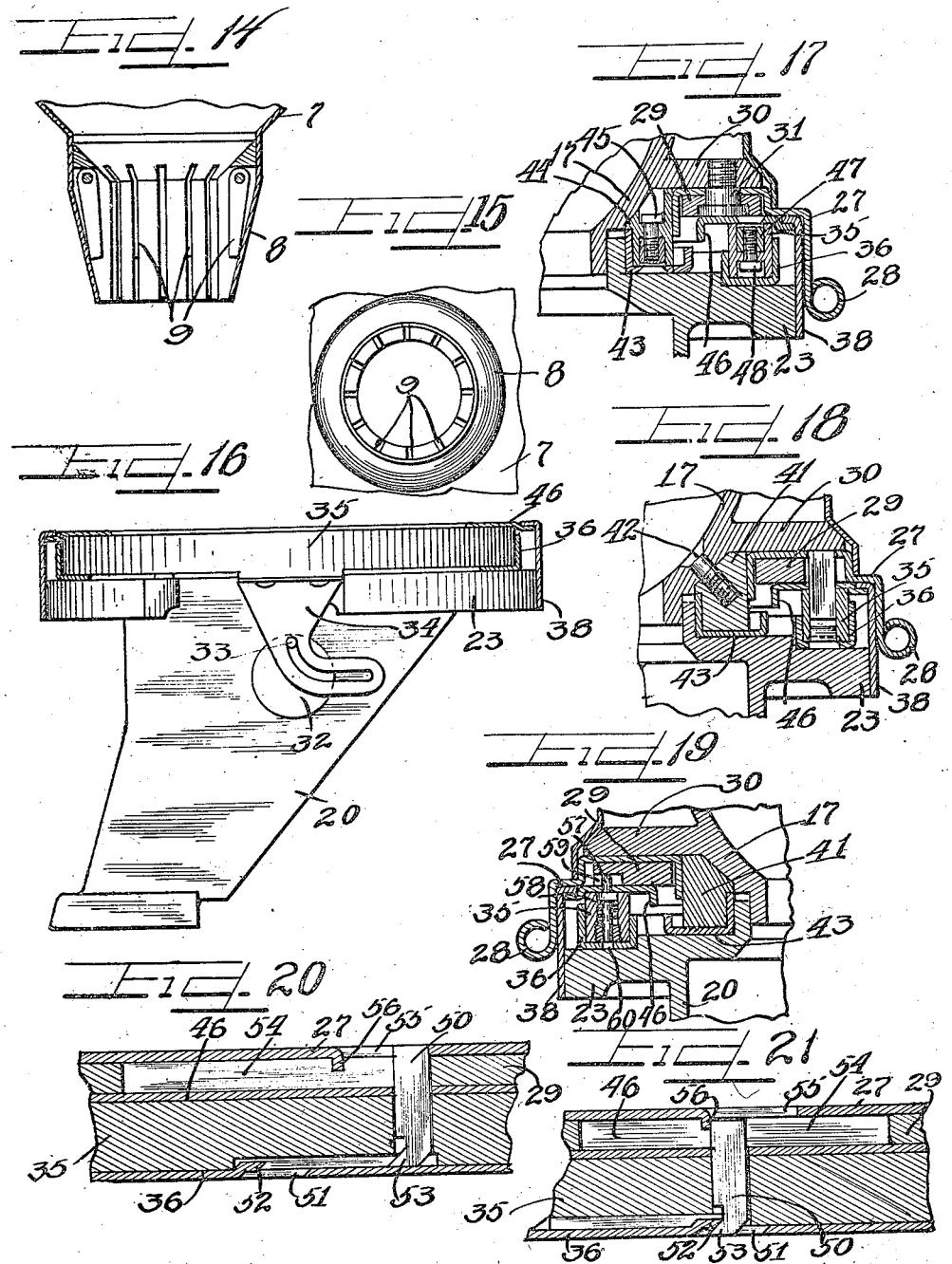

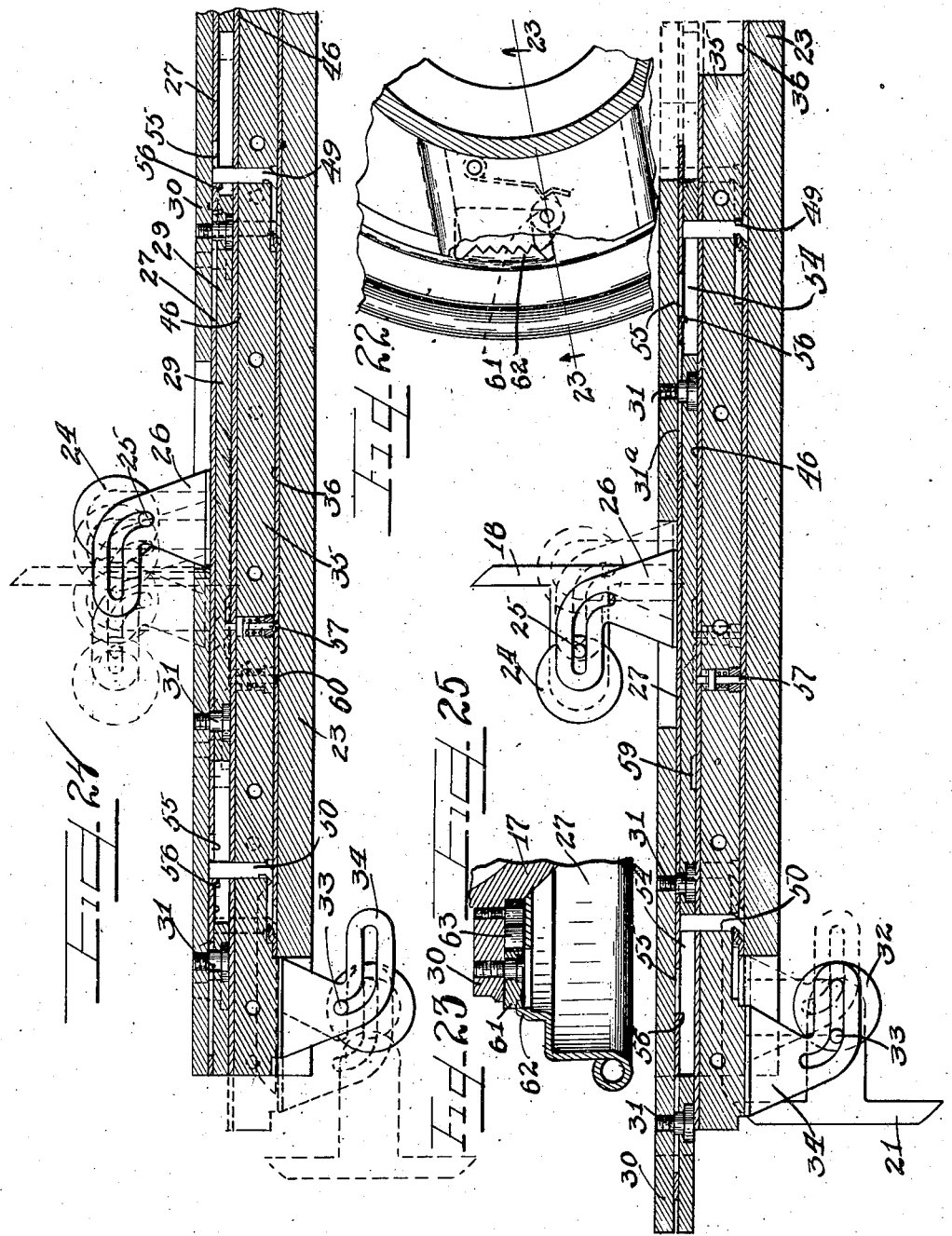

Patented Feb. 19, 1924.

1,484,052

UNITED STATES PATENT OFFICE.

HUGO J. BAUR, OF CHICAGO, ILLINOIS, ASSIGNOR TO JOHNSON FARE BOX COMPANY, A CORPORATION OF NEW YORK.

FARE REGISTER AND DETACHABLE FARE BOX.

Application filed October 10, 1919. Serial No. 329,718.

*To all whom it may concern:*

Be it known that I, HUGO J. BAUR, a citizen of the United States, and a resident of the city of Chicago, in the county of Cook and State of Illinois, have invented certain new and useful Improvements in a Fare Register and Detachable Fare Box; and I do hereby declare that the following is a full, clear, and exact description of the same, reference being had to the accompanying drawings, and to the numerals of reference marked thereon, which form a part of this specification.

This invention relates to a fare box and register construction in which the fare box or collection compartment is detachable from the register mechanism of the device and, in the hands of a conductor or other person, may be carried among the passengers to receive fares deposited therein and thereafter placed upon the register to empty the coins thereinto for registration. This form of device is particularly adaptable for use upon street cars used in a zone system where, beyond certain limits, an additional fare is collected from the passengers. Ordinarily when the street car is in the central zone of the city, the fare collector or fare box remains attached upon the fare register mechanism and the numerous passengers entering the car deposit their fares thereinto. However, as the outlying districts are reached and as the car passes into the other zones necessitating the collection of an additional fare from those of the passengers who remain on the car, the conductor detaches the fare box from the fare register mechanism, passes the same among the passengers to receive their additional fares deposited therein, and then carries the fare box back and replaces it upon the machine for registration of the coins collected.

This invention comprehends an improved construction and arrangement of locking mechanisms whereby when the fare box is detached from the fare registering mechanism, a door is closed in the bottom of the fare box preventing discharge of coins therefrom while detached, and similarly a door is closed across the chute inlet of the fare register mechanism to prevent access thereto, and the doors are only again opened by proper positioning of the fare box upon the fare register with rotational adjustment to lock the same thereon, thereby unlocking and opening the said doors.

It is an object, therefore, of this invention to construct a device embracing a detachable fare box and a coin registering mechanism with said fare box locked in proper assembled relation with the registering mechanism after being properly placed thereon and given a rotational movement and conversely, removal of the fare box from the registering mechanism necessitating a rotational adjustment thereof before the same may be lifted from the registering mechanism.

It is an object of this invention to construct a device wherein the fare box is detachable from the fare register and with the fare box provided with a closure door to close the outlet therefrom when detached and with the fare register provided with a closure door to close the inlet thereto when the fare box is detached, the operating means for both of said respective doors being mounted upon the said fare box and register respectively and locked from adjustment to operate the doors when the doors are closed except by applying the fare box to the fare register and imparting a rotational movement thereto to first unlock the operating mechanisms for the doors and thereafter to operate said mechanisms to move the doors to unlocked or open position.

Other and further important objects of the invention will be evident from the disclosures in the specification and drawings.

The invention (in a preferred form) is illustrated in the drawings and hereinafter more fully described.

*Drawings.*

Figure 1 is an elevation of the assembled machine.

Figure 2 is a top plan view thereof.

Figure 3 is a top plan view of the coin registering mechanism after detachment of the fare box.

Figure 4 is a fragmentary central vertical section taken through the upper portion of the registering mechanism and the fare box, with parts shown in elevation.

Figure 5 is a detail section taken on line 5—5 of Figure 4.

Figure 6 is an interior elevation of the handle of the fare collector showing the operating means for the closed doors of Figure 5.

Figure 7 is a detail elevation with parts omitted and parts broken away, of the interior casing of the fare box, showing the operating mechanism for the door closure to close the door when the fare box is detached.

Figure 8 is a fragmentary central vertical section somewhat similar to that shown in Figure 4 but with both the doors of the device shown in open position.

Figure 9 is a bottom plan view of the detached fare box.

Figure 10 is a fragmentary enlarged vertical section taken through the connection of the fare box to the fare register mechanism, showing the locking means for both of the respective operating mechanisms of the respective closures of the fare box and the registering mechanism.

Figure 11 is a section taken on line 11—11 of Figure 10.

Figure 12 is a detail section taken on line 12—12 of Figure 10.

Figure 13 is a view similar to Figure 12 with the parts in another position of adjustment.

Figure 14 is a fragmentary detail section of the safety means within the fare box to prevent retraction of coins deposited therein.

Figure 15 is a bottom plan view thereof.

Figure 16 is a detail side elevation with parts omitted of the operating mechanism for the door closure of the fare registering mechanism.

Figure 17 is a fragmentary detail section taken at the joint between the fare box and fare registering mechanism.

Figure 18 is a similar section taken at another part of the joint.

Figure 19 is a similar section taken at another part of the joint between the fare box and fare registering mechanism.

Figure 20 is a fragmentary sectional development view showing the relation of parts.

Figure 21 is a similar view showing the same in another position.

Figure 22 is a fragmentary detail view partly in section and partly in elevation, illustrating the mechanism for necessitating a complete rotation of adjustment of the fare box in either direction when adjusted.

Figure 23 is a section on line 23—23 of Figure 22.

Figure 24 is a development view showing the relative position of the parts of the locking mechanism with the respective closure doors closed.

Figure 25 is a similar development view illustrating the relative position of the parts with the closure doors open.

*Description.*

Referring to Figure 1, the fare registering mechanism is denoted as a whole by the reference numeral 1, and the fare box or fare collector by the reference numeral 2, and the fare registering mechanism is provided with a crank 3, for operating the coin counting devices therein, which, however, form no part of the present invention. A window 4, displays the register numerals showing the fares received into the machine. The fare box 2 is provided with a handle 5, by which the same may be carried in upright position when the box is detached from the fare register 1, and this handle also affords a means of imparting a rotational adjustment to the fare box 2 in attaching and detaching the same from the fare register.

As shown clearly in Figure 4, the coins deposited on the apertured top plate 6, fall into the conical chute 7, and falling thus through, pass out the outlet 8 in which are pivoted a number of fingers 9, which operate as a safety device, said fingers falling inwardly to close said outlet 8, in the event that the fare box is inverted for unauthorized removal of the coins therefrom. The coins are received upon a pair of normally closed horizontally disposed hinged doors 10, and may then be inspected. As shown in Figures 7 and 8, each of said doors is provided with a rod 11 extending therethrough, the ends thereof projecting through curved slots 12 in the casing and engaged in the slotted ends of a cross bar 13, which is secured upon the lower end of a slidable push rod 14, having a finger piece 15, above the handle 5 convenient for operation. A spring 16ª is disposed beneath the lower end of the push rod 14, as shown in Figures 4 and 6, normally holding same upwardly and to hold said door 10 in closed position.

The fare box consists of a metal casing 2, shown in Figure 1, cut-away and provided with a cylindrical glass insert 16 forming a closed receptacle.

Within the detachable fare box beneath the dumping doors is a supplementary casing denoted by the reference numeral 17 and as shown in Figure 8, a closure door therefor is provided, denoted by the reference numeral 18, mounted upon a transverse shaft 19 and adapted to close the outlet from the lower end of said casing 17. Mounted within the fare registering casing is a chute 20 to receive the coins discharged from the fare box and said chute forms a part of an upper casing structure for the fare register having a door closure 21 adapted to close the entrance into the fare register when the fare box is detached therefrom. Said door 21 is mounted upon a transverse shaft 22.

The upper casing structure which is integral with the chute 20, is in the form of an annulus 23, affording a base ring on which other elements are rotatably mounted as hereinafter described and the lower end of the interior casing 17 of the fare box interfits with the aperture through said ring 23 as clearly shown in Figure 4.

The respective transverse shafts 19 and 22 for the respective closures 18 and 21 are at right angles to one another. On one end of the transverse shaft 19 as shown in Figures 4 and 7 is a disc 24, having a crank pin 25 thereon which engages a slot in an operating member 26 attached upon a rotatable ring 27 flanged downwardly and at its outer margin provided with a bead 28. The ring 27 as clearly shown in Figure 17 engages over a ring 29 which is held rigidly attached to a flange portion 30 of the casing 17 by screws 31 and slots are provided in said ring 27 to permit relative rotational adjustments thereof with respect to the fare box.

Similarly, as shown in Figure 16, an operating mechanism is provided for the door 21. Secured upon the outer end of the shaft 22 as shown in Figures 8 and 16, is a disc 32 provided with a pin 33, engaging in a slot of a curved operating arm 34 which is secured upon the under surface of an operating ring 35 which is capable of a rotational adjustment. Said operating ring 35 is slidable upon a channel ring 36 which is rotatable upon the base ring 23. Said ring 35 as shown in Figure 10 carries the slidable plunger locking means whereby said ring 35 is locked from adjustment when the device is in closed position with the fare box detached, to lock the door in the entrance thereof closed. Said plungers or cylinders are denoted by the reference numerals 37 and as shown in Figure 10 have a restricted neck portion adapted to register with the edge of the rotatable channel ring 36 to prevent relative movement between ring 35 and the channel ring 36 when said plungers are so registered. Rigidly secured to the base ring 23, and projecting upwardly from the periphery thereof, is a ring or collar 38 provided with pins 39 adapted to engage with bayonet slots 40 in the ring element 27 of the detachable fare box.

Rigidly attached to the inner casing 17 of the fare box as shown in Figures 10 and 18, is a ring member 41 held attached by screws 42ª, and said ring member carries locking plungers 42, each of which has a neck of restricted diameter similar to that described with reference to the locking plungers 37. It is obvious by reference to Figure 10 that locking plungers 37 are spring impelled outwardly out of register with the channel ring 36, to interlock therewith, and likewise the locking plungers 42, the restricted portions of which engage with the downwardly flanged portion of the ring 27, are movable outwardly out of register therewith to interlock with the same.

Securely attached to the ring 41 is a cam ring 43 of channel section as shown in Figures 17, 18 and 19 and as shown particularly in Figure 17, said cam ring 43 has riveted thereto inserts 44 which are attached to the ring element 41 by means of screws or bolts 45, this method of attachment being used for the purpose of assembly. It is apparent therefore that cam ring 43 is rotatable as a unit with the detachable fare box in its adjusting movements for application to, or removal from the registering mechanism.

Another cam ring 46, is provided which is of substantially channel shape in section and projects downwardly and is associated with the fare registering mechanism. This latter cam ring 46 is rigidly secured to the movable ring member 35 as shown in Figure 17, and for this purpose a block 47 is secured to the inner surface of the cam ring and is engaged by an attaching screw or bolt 48, in a recessed portion of the ring member 35.

The cam ring 43 attached to the fare box is adapted to operate the slidable locking cylinders 37 of the fare registering mechanism and conversely the cam ring 46 of the fare registering mechanism is adapted to operate the slidable locking cylinders 42 of the fare box. The slidable ring member 35 has a lost motion connection with the slidable channel ring 36 and this connection is clearly shown in Figures 20 and 21. Two upright slide bolts 49 and 50 are provided in the ring member 35, as shown clearly in Figures 12 and 13, almost diametrically opposite to one another. The lower ends of the said bolts are adapted to rest upon the channel ring 36, and when registering with apertures 51 therein, resting upon the base ring 23. As shown clearly in Figures 20 and 21 the ring member 35 is recessed along its bottom surface and projecting upwardly into the recesses are inwardly directed projections 52 and said projections are adapted to contact against the inclined surfaces 53 formed on the lower ends of the slide bolts 49 and 50 to cause the same to travel downwardly into the apertures 51 when the ring member 35 is rotated relative to the channel ring 36 in a direction to bring the slide bolts 49 and 50 both operating simultaneously and for a like purpose, into a position to cause the inclined surfaces 53 to strike against the projections 52. At its upper end each of said bolts 49 and 50 projects through a recess 54, in the ring element 29 and is adapted when the said bolts are elevated to project into another recess or aperture 55 formed in the casing ring 27 of the fare box. Disposed at one end of each of the apertures 55 in the ring 27 is a downwardly turned projection 56 adapted for co-action with the bolts 49 and 50 when the same are in their lower position as shown in Figure 21.

As shown in Figures 19 and 24 a means is provided for interlocking the channel ring 36, the ring member 35 and the cam ring 46 and this comprises a pin 57 slidable in the ring 35, against the pressure of a spring 58. The under surface of the ring 29 above said pin 57, is recessed as denoted by the reference numeral 59 and the channel ring 36 is provided with an aperture 60 for said pin 57.

Mechanism is provided as shown in Figures 22 and 23 to insure a complete rotational adjustment of the fare box upon the fare register to attach or detach the same as the case may be, when once such an adjusting movement has been instituted. This mechanism comprises a pivoted pawl 61, attached in a recessed portion of the flange 30, of the fare box 17, adapted to co-act with a small rack bar 62 formed by a notched upturned portion of the ring element 27, and the spring 63, for said bar is disposed to bear against the tail extension thereof.

Operation.

If it is desired to detach the fare box, to pass the same among the passengers to receive the additional fare deposited therein, the first movement on the part of the operator is by the handle 5 of the fare box to rotate the same in a counter clockwise direction, so that the mechanisms are in the position shown in the development view shown in Figure 24. Prior to such movement the door 18 of the fare box is in open position and the door 21 of the fare register is also in open position. The rotational movement, of course, causes the fixed flange portion 30 of the fare box casing and the attached ring member 29 to move therewith and to the right.

However, the ring 27 does not partake of this movement at first owing to frictional engagement with the stationary casing ring on the fare registering mechanism. As a result the bracket 26 is for the time being, stationary, and the disc 24 moving with the fare box in its rotational adjustment, causes the pin 25 to travel inwardly on the curved slot of the bracket 26 thereby causing the door 18 to close.

However, the rotational adjustment of the members 30 and 29, without the ring 27, only continues for a short period sufficient to cause the closure of the door and inasmuch as the cam ring 46 is stationary for the time on the fare register, the tumblers or lock cylinders 42, having been moved around with the fare box into position for release relative to the cam 43 are thereby interlocked with the ring 27, and as a consequence the ring 27 is thereafter locked to the members 29 and 30 and continues with them in their rotational adjustment.

As the ring 27 begins its movement, the abutments 56, contact the upright bolts 49 and 50 thereby imparting movement to the cam ring 46, and the ring 35, as the member 29 moves along with the member 30, the recess 59 is brought into register over the pin 57, permitting the same to spring upwardly and releasing the member 35 from channel ring 36. Movement of the ring 35 over the ring 36 causes the upright bolts 49 and 50 to rise upwardluy out of the recesses therefor in the channel ring 36 and to be projected upwardly through the recesses 55 in the ring 27, thus additionally locking the ring 27 from reverse rotation with reference to the other elements should the operator of the machine attempt to rotate the same for the purpose of opening the fare box door. However, owing to the fact that the cam ring 43 is rigid upon the fare box it has been rotated into position with reference to the plungers 37, to release the same. The ring 35 and channel ring 36 are locked together again at the time the elongated recesses of the ring 35 travels over the upturned projections 52. Thereafter the channel ring 36 and ring 35 are locked together by the plungers against unauthorized adjustment to open the door 21. The rotational adjustment of the ring 27 which is transmitted thereto after it becomes locked by the lock cylinders 42, causes the bayonet slots 40 of the ring 27 to travel to open relation with reference to the pins 39 on the fare register whereby the fare box may be detached. Referring to Figure 24, when it is desired to engage the fare box upon the fare register for the purpose of dumping the coins collected in the fare box into the fare register, the fare box is placed upon the fare register with the bayonet slots engaging the pins 39 and a clockwise rotation is given to the fare box. This causes the members 29 and 30 to begin to travel to the left referring to Figure 24 and owing to the fact that the ring 27, is locked thereto by the lock cylinders 42, for the time being said ring moves therewith and operation of the door does not take place immediately. This is for the reason as pointed out that the pin 25 and the disk 24 are moving with the bracket 26 owing to rotational adjustment of the fare box.

However, the rotational adjustment of the fare box with reference to the temporarily stationary cam 46 causes operation of the tumblers 42 into unlocked position to release the ring 27 whereupon the same becomes stationary and the disc 24 is moved relative to bracket 26 causing closure of the door 18. Furthermore, prior to the time of release of the ring 27, it has traveled sufficiently so that the slots 55 have been moved past the upright bolts 49 and 50 to cause the ends of the slots to contact thereagainst so that the ring 27 is retarded thereby.

With the released ring 27 held from movement the ends of the slots 31ª are finally contacted by the pins 31 and then the ends of the slots 55 begin to move the bolts 49 and 50 to the left and the cam ring 46, ring 35, are also given the rotation and this continues until the bolts 49 and 50 at their lower ends engage the projections 52 and are thereby retracted out of the recesses 55. Furthermore the pin 57, is brought into register with the aperture 60 and springs thereinto thus locking the rings 35 and 36 together.

The ring 27 having been rotated during this time around upon the casing ring 38 to engage the bayonet slots 40 with the pins 39, this ring is held from further rotation inasmuch as it is in released relation with the cylinders 42, and the continuing rotational adjustment of the flange 30 and the ring 29, relative the ring 27 causes the pin 25 to slide in the straight slot portion of the bracket 26. The door 21, of course, is opened upon the return adjusting movement of the ring 35 immediately after the rotational adjustment of the members 29, 30 and 27 when the slot 55 travels over the same to contact with upper end of the bolts 49 and 50.

I am aware that numerous details of construction may be varied through a wide range without departing from the principles of this invention and I therefore do not purpose limiting the patent granted otherwise than necessitated by the prior art.

*Claims.*

1. The combination with a fare register of a detachable fare box and interlocking mechanism therebetween, a door for closing the outlet from the fare box, a door for closing the inlet to the fare register, means mounted upon the fare register for operating its door, means mounted upon the fare box for operating its door, slidable locking cylinders for co-action with each of said means to lock and unlock the same according to the adjustment of the cylinders and a cam member on both the fare box and the fare register for co-action with the respective cylinders, to operate the same into locked and unlocked position whereby the doors actuated into closed position are locked when the fare box is detached and are unlocked for operation into open position when the fare box is attached to the fare register.

2. The combination with a fare register of a detachable fare box adapted to be attached thereto, closure means for both the fare register and fare box operated into closed position and locked therein when the fare box is detached, means for unlocking said closure when the fare box is attached upon said fare register, mechanism for operating the respective closures to open position when the fare box is attached to the fare register, said mechanism for the respective closures having a rotational adjustment with respect to the fare register and fare box, and means engaging the fare box to the fare register by rotational adjustment thereof when applied to the fare register.

3. The combination of a fare register and detachable fare box of means for locking the fare box to the fare register, closure devices associated with each thereof adapted to be operated to closed locked position when the fare box is detached and to be operated to open position when the fare box is attached to the fare register, a plurality of locking cylinders operable to lock said respective closures from operation when in closed position, certain of said cylinders carried by the fare box and certain by the fare register and means carried by the fare box and fare register for operating the locking cylinders of one another to operate the same into locked and unlocked position according to the adjustment of the fare box upon the fare register.

4. In a device of the class described the combination with a fare register of a fare box detachable therefrom, closure devices associated with each thereof adapted to be operated into closed locked position when the fare box is detached, a revolvable ring member on each thereof for operating the respective closure devices, locking cylinders associated with each thereof to lock the ring members from adjustment when the closure devices are in closed position and cam rings carried upon each of the said members adapted to operate the respective locking cylinders to unlock the said rings when the fare box is applied to the fare register and adjusted for proper co-operation therewith.

5. In a device of the class described, a detachable fare box, a closure therein, a horizontal ring rotatably mounted in the fare box surrounding the closure and adapted to operate the closure to closed position, locking cylinders slidably mounted in the fare box to interlock with said ring to lock the closure in closed position, a fare register and means thereon to operate the said cylinders of the fare box into unlocked position when the fare box is applied thereto.

6. The combination with a fare register of a detachable fare box for co-operation therewith, said fare box comprising a closure to close the outlet therefrom, a rotatable ring mounted in the fare box for operating the closure to closed position, locking cylinders associated with the fare box to lock said ring when the closure is in closed position, means upon the fare register to operate said cylinders to unlocked position when the fare box is applied to the fare register for opening of said closure and inter-engagement means between the fare box and the fare register for engagement of the fare box with register coincident with operating movement of the mechanism to unlock and open said closure.

7. In a structure of the class described the combination with a fare register of a detachable fare box adapted to be applied and detached to and from the fare box by rotational adjustment, a closure to close the fare register when the fare box is detached, a rotatable ring for operating said closure to closed and open position, locking cylinders associated with the fare register to interlock with said ring when the closure is in closed position and a means carried by the fare box for operating said cylinders to release said ring and permit operation of the closure to open position when the fare box is applied to the fare register.

8. In a structure of the class described the combination with a fare register of a fare box detachable therefrom and adapted to be applied and detached to and from the fare register by rotational adjustment, a closure for the fare register, rotatable means for operating said closure to open and closed position, slidable locking cylinders for interlocking with said means to lock the same when the closure is in closed position, and a cam ring mounted upon the fare box for co-action with said cylinders to operate the same to unlocked position to release said means and permit operation of the closure to open position when the fare box is applied to the fare register.

9. In a structure of the class described the combination with a fare register of a detachable fare box adapted to be attached thereto by rotational adjustment, closure means for the fare box, a rotatable ring on the fare box for operating the closure, locking cylinders radially disposed with reference to said ring to interlock with said ring when the closure is in closed position, a rotatable cam ring upon the fare register for operating said cylinders to release position when the fare box is applied to the fare register, a closure for the fare register, means associated with the fare register for operating the same and for locking the closure in closed position and means upon the fare box for releasing and causing operation of the fare register closure to open and closed position.

10. The combination of a fare register and a detachable fare box adapted to be engaged thereto, a closure in the fare box, a closure in the fare register, co-acting mechanisms between said fare box and fare register for operating said closures, the closure of the fare box operating both to open and closed position prior to the operation of the closure of the fare register.

11. The combination with a fare register of a fare box adapted to be engaged thereto to discharge coins thereinto when collected in the fare box, a ring rotatably associated with the fare box, means upon the fare register for co-action with said ring to engage the fare box to the fare register by rotational relative adjustment therebetween, closure devices associated both with the fare box and with the fare register, means upon the fare register for causing operation of the closure device of the fare box, and means upon the fare box for causing operation of the closure device of the fare register.

12. The combination with a fare register of a fare box detachable therefrom and adapted to be engaged thereto, said fare box comprising a compartment to receive coins deposited therein, means for dumping the coins into said compartment, a closure for the outlet from said compartment, horizontally positioned, rotatable means upon the fare box surrounding the closure for operating said closure, radially disposed slidable locking devices for locking said means when the closure is in closed position and means upon the fare register for operating said devices when the fare box is applied to the fare register.

13. In a structure of the class described a fare box, a rotatable closure therefor, rotatable means movable about an axis at right angles thereto, for operating said closure, a locking device for locking said means, a fare register adapted to support the fare box and mechanism upon the fare register for operating the locking device by movement of the fare box to release said means for operation of the closure of the fare box.

14. The combination with a fare register of a fare box detachable therefrom, a rotatable closure within the fare box adapted to move about a horizontal axis, means movable about a vertical axis for operating said closure, devices for locking said means and mechanism upon the fare register for operating said devices into release position to permit operation of the closure by said means.

15. A detachable fare box for a fare register comprising a compartment for the reception of coins, a closure therefor automatically operated into closed position when the fare box is detached from the fare register, a revolvable means mounted in the fare box for operating the said closure, the axis of said means at right angles to the axis of the closure, radially disposed locking devices in the fare box for interlocking with said means and revolvable means mounted on the fare register for operating said devices into released position and by attachment of the fare box to the fare register causing operation of the closure by said means to move the closure to open position.

16. The combination with a fare register of a detachable fare box, a rotatable closure for the fare register operable about a horizontal axis, a rotatable ring revolvable about a vertical axis for operating said closure, interlocking means on the fare register for locking said ring and means upon the fare box for operating said means for release of the ring and operation of the closure coincident with attachment and detachment operations of the fare box upon the fare register.

17. The combination with a fare register of a detachable fare box and interlocking mechanism therebetween, a door for closing the outlet from the fare box, a door for closing the inlet to the fare register, a slidable ring mounted upon the fare register for operating its door, a slidable ring mounted upon the fare box for operating its door, a set of radial locking cylinders for co-action with each of said rings to lock and unlock the same according to the adjustment of the cylinders and a cam ring on both the fare box and the fare register for co-action with the respective cylinders, to operate the same into locked and unlocked position whereby the doors actuated into closed position are locked when the fare box is detached and unlocked for operation into open position when the fare box is attached to the fare register.

18. The combination with a fare register of a detachable fare box adapted to be attached thereto by rotational adjustment, pivoted doors for both the fare register and fare box operated into closed position and locked therein when the fare box is detached, means for unlocking said doors when the fare box is attached upon said fare register, rotational rings for operating the respective doors to open position when the fare box is attached to the fare register, said rings for the respective closures having a horizontal adjustment with respect to the fare register and fare box, and means engaging the fare box to the fare register due to the rotational adjustment thereof when applied to the fare register.

19. The combination of a fare register and detachable fare box of pin and slot means for engaging the fare box to the fare register, pivoted closure devices associated with each thereof adapted to be operated in successive order to closed locked position when the fare box is detached and to be operated to open position when the fare box is attached to the fare register, a plurality of sets of locking cylinders operable to lock said respective closures one for each thereof from operation when in closed position, one set of said cylinders carried by the fare box and one set by the fare register.

20. In a device of the class described the combination with a fare register of a fare box detachable therefrom, doors associated with each thereof adapted to be operated into closed locked position when the fare box is detached, a revolvable ring member on each thereof for operating the respective doors, spring impelled locking cylinders to lock the ring members from adjustment when the closure devices are in closed position and cam rings carried upon each of the said members one revolvable and both adapted to operate the respective locking cylinders to unlock the said rings when the fare box is applied to the fare register and adjusted for proper co-operation therewith.

21. In a device of the class described, a detachable fare box, a closure pivoted in the outlet thereof, a ring rotatably mounted in the fare box adapted to operate the closure to closed position, locking cylinders slidably mounted in the fare box to interlock with said ring to lock the closure in closed position, a fare register and means revolvably mounted thereon to operate the said cylinders of the fare box into unlocked position when the fare box is applied thereto.

22. The combination with a fare register of a detachable fare box for co-operation therewith, said fare box comprising a pivoted closure to close the outlet therefrom, an eccentric connected thereto, a rotatable ring mounted in the fare box, a bracket thereon co-acting with said eccentric for operating the closure to closed position, locking cylinders associated with the fare box to lock said ring when the closure is in closed position, revolvable means upon the fare register to operate said cylinders to unlocked position when the fare box is applied to the fare register for opening of said closure and releasable inter-engaging pin and slot devices between the fare box and the fare register for engagement of the fare box with the register coincident with operating movement of the mechanism to unlock and open said closure.

23. In a structure of the class described the combination with a fare register of a detachable fare box adapted to be applied and detached to and from the fare box by rotational adjustment, a closure operated automatically to close the fare register when the fare box is detached, a rotatable ring for operating said closure to closed and open position, locking cylinders associated with the fare register to interlock with said ring when the closure is in closed position and a fixed means carried by the fare box for operating said cylinders to release said ring and permit operation of the closure to open position when the fare box is applied to the fare register.

24. In a structure of the class described the combination with a fare register of a fare box detachable therefrom and adapted to be applied and detached to and from the fare register by rotational adjustment, a pivoted closure for the fare register, rotatable means on an axis perpendicular to the axis of said closure for operating said closure to open and closed position, slidable locking means for inter-locking with said means to lock the same when the closure is in closed position, and a cam ring fixed upon the fare box to rotate therewith for co-action with the said cylinders to operate the same to unlocked position to release said means and permit operation of the closure to open position when the fare box is applied to the fare register.

25. In a structure of the class described the combination with a fare register of a detachable fare box adapted to be attached thereto by rotational adjustment, a pivoted door closure for the fare box, a slidable rotatable ring on the fare box for operating the closure, locking means radially disposed with reference to said ring to interlock with said ring when the closure is in closed position, a rotatable cam ring upon the fare register for operating said means to release position solely by relative movement of the fare box when the same is applied to the fare register, a door closure for the fare register, means associated with the fare register for operating the same, means for locking said closure in closed position and means fixed upon the fare register for releasing and causing operation of the fare register closure to open and closed position.

26. In a device of the class described, a detachable fare box, a movable closure therefor, rotatably mounted means adapted to operate the closure to closed position, locking means slidably mounted in the fare box to interlock with said rotatably mounted means to lock the closure in closed position, a fare register, and means revolvably mounted thereon to operate said locking means into unlocked position solely by relative movement of the fare box when the same is applied thereto.

27. In a device of the class described, a detachable fare box, a fare register on which the fare box is removably mounted, a closure in the fare box outlet, and a ring rotatably mounted in the fare box and adapted to operate the closure to close the outlet solely by relative movement of the fare box when the same is removed from the fare register.

In testimony whereof I have hereunto subscribed my name in the presence of two subscribing witnesses.

HUGO J. BAUR.

Witnesses:
 EARL M. HARDING,
 CHARLES W. HILLS.